(12) United States Patent
Kapoor

(10) Patent No.: US 9,905,136 B2
(45) Date of Patent: *Feb. 27, 2018

(54) ROLE BASED HISTORY IN A MODULAR LEARNING SYSTEM

(71) Applicants: Monk Akarshala Design Private Limited, Mumbai (IN); Monk Akarshala Inc., Sacramento, CA (US)

(72) Inventor: Samridh Kapoor, Mumbai (IN)

(73) Assignees: MONK AKARSHALA DESIGN PRIVATE LIMITED, Mumbai (IN); MONK AKARSHALA INC., Sacramento, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/426,650

(22) Filed: Feb. 7, 2017

(65) Prior Publication Data

US 2017/0148336 A1 May 25, 2017

Related U.S. Application Data

(63) Continuation of application No. 14/344,530, filed as application No. PCT/US2012/054696 on Sep. 12, 2012, now Pat. No. 9,563,676.

(30) Foreign Application Priority Data

Sep. 13, 2011 (IN) .......................... 2579/MUM/2011

(51) Int. Cl.
G06F 17/30 (2006.01)
G09B 5/06 (2006.01)
(Continued)

(52) U.S. Cl.
CPC .............. *G09B 5/065* (2013.01); *A63B 69/00* (2013.01); *G06F 17/30011* (2013.01);
(Continued)

(58) Field of Classification Search
CPC ......... G06F 17/30864; G06F 17/30424; G06F 17/30368; G06F 17/30973; G06F 3/04842; G06F 3/0482; G06F 3/0842
See application file for complete search history.

(56) References Cited

U.S. PATENT DOCUMENTS 7,736,150 B2 * 6/2010 Pfund ...................... G09B 5/00 434/322
2006/0200556 A1 * 9/2006 Brave ............... G06F 17/30867 709/224

(Continued)

*Primary Examiner* — Dung K Chau
(74) *Attorney, Agent, or Firm* — Innovation Capital Law Group, LLP; Vic Lin

(57) ABSTRACT

A modular learning system provides user histories to a viewing user. The modular learning system maintains a database of activity items associated with a set of user roles allowed to view and interact with the activity items. The activity items are generated as users perform actions on the modular learning system. The modular learning system receives a request for a user history from a viewing user. The modular learning system verifies a viewing user's role and identified activity items that are accessible to the viewing user based on the viewing user role. The identified activity items are used to generate histories that are provided to the viewing user.

20 Claims, 7 Drawing Sheets

(51) Int. Cl.
 *G09B 19/00* (2006.01)
 *A63B 69/00* (2006.01)
(52) U.S. Cl.
 CPC .... *G09B 19/0038* (2013.01); *G06F 17/30424* (2013.01); *G06F 17/30554* (2013.01); *G06F 17/30864* (2013.01); *G06F 17/30867* (2013.01)

(56) References Cited

U.S. PATENT DOCUMENTS

| | | | | |
|---|---|---|---|---|
| 2008/0126285 | A1* | 5/2008 | Dinger | G09B 7/02 706/47 |
| 2008/0263009 | A1* | 10/2008 | Buettner | G06F 17/30979 |
| 2008/0307505 | A1* | 12/2008 | Persaud-Deolall | G06F 21/6281 726/4 |
| 2011/0137836 | A1* | 6/2011 | Kuriyama | A61B 5/1118 706/12 |
| 2011/0181683 | A1* | 7/2011 | Nam | H04N 5/44513 348/14.07 |
| 2011/0202574 | A1* | 8/2011 | Iwase | G06F 17/30011 707/802 |
| 2011/0289161 | A1* | 11/2011 | Rankin, Jr. | G06Q 10/107 709/206 |
| 2012/0303644 | A1* | 11/2012 | Martin, Jr. | G06Q 30/02 707/756 |
| 2013/0332311 | A1* | 12/2013 | Pu | G06F 17/3089 705/26.8 |

\* cited by examiner

ROLE BASED HISTORY IN A MODULAR LEARNING SYSTEM

CROSS REFERENCE TO RELATED APPLICATIONS

This application is a U.S. National Stage of International Application No. PCT/US2012/054696, titled "Role Based History in a Modular Learning System" filed on 12 Sep. 2012, which claims the benefit of Indian Provisional Specification No. 2579/MUM/2011, titled "Role Based History in a Learning System" filed on 13 Sep. 2011, both of which are incorporated by reference in their entireties.

FIELD OF THE ART

The present invention relates generally to modular learning systems, and more particularly to systems and methods of generating role-based histories in a modular learning system.

DESCRIPTION OF THE RELATED ART

The current education environment includes various members like learners, teachers, tutors, coaches, lecturers, content authors, schools, educational boards, professional standards authorities, admission testing authorities, placement organizations, recruiters, publishers and various governments. These members maintain transactional and functional relationships with each other. Members are unaware of each other's activities in their respective activities through an organized medium, except for isolated activity such as bulletin boards, newsletters, circulars, as well as journalistic articles. Such services, though useful, do not enable the said members to view a comprehensive activity history of other members, especially those who play another role in the current educational environment.

Each of a plurality of kinds of users on the modular learning system are not able to grant granular access to each such user's activity history on the modular learning system, to one or a subset of the plurality of other users in a variety of other user roles on the said modular learning system through a user role history management interface generated and displayed with corresponding interface items and input areas to each such requested user on the said user's preferred user device; and for each corresponding viewing user to view each such user's activity history, through an exemplary user role history viewing interface generated and displayed with corresponding interface items to each such viewing user on the user's user device.

SUMMARY OF THE INVENTION

A system and a computer-implemented method for providing role based histories to a requested user in a modular learning system is disclosed. A modular learning system provides user histories to a viewing user. The modular learning system maintains a database of activity items associated with a set of user roles allowed to view and interact with the activity items. The activity items are generated as users perform actions on the modular learning system. The modular learning system receives a request for a user history from a viewing user. Upon receiving the request, the modular learning system verifies a viewing user's role and identifies activity items that are accessible to the viewing user based on the viewing user role. The identified activity items are then used to generate histories that are provided to the viewing user.

In an aspect, the invention further provides a non-transitory computer readable storage medium having tangibly embodied thereon a program of instructions executable by a processor for performing a method for generating role-based histories in a modular learning system This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be made apparent from the following detailed description of embodiments that proceeds with reference to the accompanying drawings.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to embodiments by way of illustration only. It should be noted that from the following discussion, alternative embodiments of the systems, methods, figures, diagrams and interfaces disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the systems, methods, figures, diagrams and interfaces illustrated herein may be employed without departing from the principles described herein. In the following description, for the purposes of explanation, numerous specific details are set forth in order to provide a thorough understanding of the various embodiments. It will be evident, however to one skilled in the art that the various embodiments may be practiced without these specific details.

Configuration Overview

A system and method for generating role-based activity histories in a modular learning system environment is provided. In one embodiment, a role-based activity history management module is used in a modular learning system 144 and comprises a plurality of modules and generators like a purchase items module, a performance items module, a user databases module, a user role preferences module, a user role validation module, a history items module, a summary updation module, an activity monitoring module and a user role history interface generator. A method for generating role-based activity histories in a modular learning system environment may comprise receiving a history items display request from a viewing user, determining the viewing user's user role in the modular learning system, determining if the viewing user is same as the user whose history is requested, determining requested user's user role in the modular learning system, displaying the history access request to the requested user, retrieving items relevant to the requested user's user role, generating history items for the requested user based on the user's user role in the modular learning system, and displaying the requested history items to the viewing user.

Figure 1:
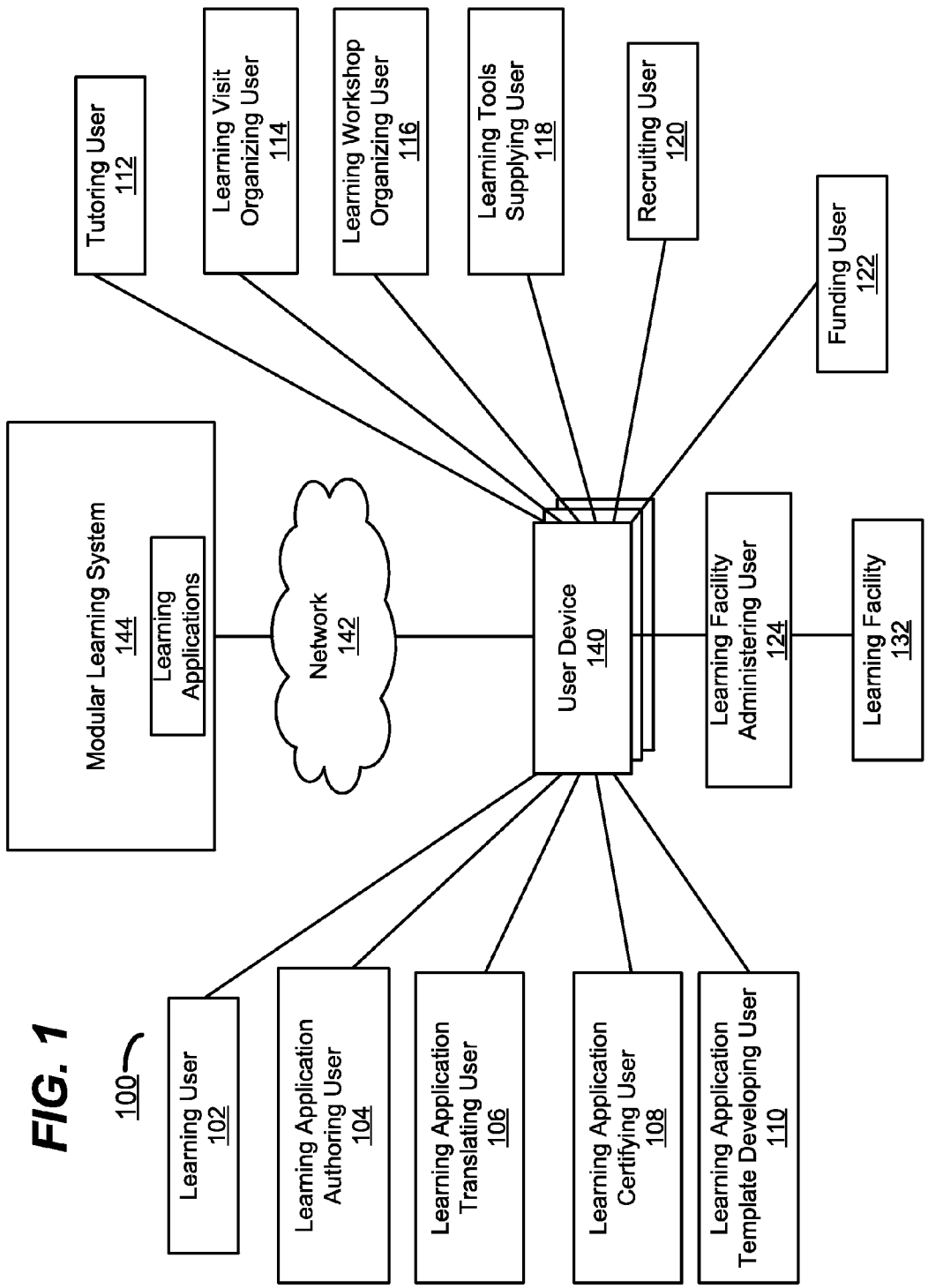
FIG. 1 is a modular learning environment including a modular learning system 144 according to one embodiment.

Figure (FIG. 1 is a modular learning environment 100 including a modular learning system 144 according to one embodiment. Modular learning system 144 operates in modular learning environment 100 and communicates with a plurality of user devices 140 over a network 142. The user devices 140 are operated by a plurality of kinds of users in the learning environment. The user devices 140 may comprise any of a variety of computing devices, such as a desktop computer, a laptop, a mobile device, a tablet computer, a set-top box, a kiosk, interactive television, gaming console, and other computing platforms suitable for communicating with modular learning system 144. The modular learning system 144 provides a system for managing curricula, learning facilities, standardized tests, learning applications, tutors, and other modules of a learning experience in micro increments of time and money. The modular learning system 144 enables the various users to communicate with other users in a learning environment and provide services to learning user 102. The network 142 includes a wireless area network, a local area network, a General Packet Radio Service (GPRS) network, an Enhanced Data for Global Evolution (EDGE) network and the like. The user devices 140 are connected to the modular learning system 144 via the network 142.

Modular learning system 144 allows a learning user 102 to manage the purchase and performance of each module of a single microlearning service stack for a learning application (e.g. Breaststroke) or a group of learning applications (e.g. Breaststroke, Freestyle, Butterfly and Swimming Safety). Tutor access, such as access to a swimming instructor may be purchased in various increments, such as in hours. Learning content applications such as a breaststroke application with attached instructional media and other data may be purchased in timed access quantities or may be permanently purchased. Learning facility access such as an Olympic Sized Swimming Pool may be purchased in increments of hours or learning application performances such as ten laps. Learning tools or materials such as Swimming Goggles may be purchased as well. Each of these modules may be separately purchased and interacted with through an interface displayed on user device 140. In case of a learning performance which can be completed on the user device 140 itself, the learning application content is not only purchased and managed, but also performed, through an interface displayed on the user device 140. A learning user 102 may manage the purchase and performance of groups of microlearning performances in the form of learning visits and learning workshops, through an interface displayed on user device 140. Learning user 102 may manage an individual learning identity (or learning profile) and offer details of microlearning application performances completed by the learning user, as well as the personal learning metrics, scores, and reviews. This learning identity may be provided to recruiting users for the purpose of placement.

The modular learning system 144 manages, regulates and supervises the purchase, sale, preview, performance and review of a plurality of microlearning applications, each comprised modularly of a tutoring service, a learning application, learning facility access, and/or learning tools or infrastructure access, a learning visit, and/or a workshop as described in further detail below. The modular learning system 144 manages transactional and functional relationships between users of the modular learning system 144. These various users interact with the modular learning system 144 to modify learning applications and provide learning services as described below.

The modular learning system 144 may enable various other users including but not limited to tutors, authors, tool/material suppliers learning application template developers, translators, certifying user, learning facility administrators, learning event organizers, recruiters, and funders to modularly manage at least one of micro tutoring services associated with specific learning applications, microlearning content applications, microlearning application templates, translation of microlearning content applications, certification of microlearning content applications, access to learning facilities, access to learning workshops, organization of learning visits associated with specific learning applications, supply of tools, aids and/or materials, recruitment services, as well as granular funding services.

The modular learning system 144 enables a tutoring user 112 to provide micro tutoring services to learning user 102. Tutoring user 112 are typically individuals with credentials or other knowledge in the area of learning applications. The tutoring user 112 may associate themselves with particular pieces of content to and may indicate qualifications to teach each learning application, as is described further below. The modular learning system 144 manages the sale of micro tutoring services and associated tutoring user 112 with specific learning applications to learning user 102. Tutoring user 112 assist the learning user 102 with learning the subject matter of the learning application. The tutoring user may provide tutoring to the learning user 102 by meeting the learning user 102 in person to assist the learning user 102 in performing the learning application. As such, the modular learning system 144 facilitates the meeting and communication of tutors and learners. Tutoring user 112 may also provide learning performance data to the modular learning system 144. The learning performance data may indicate, for example, the level of the learner's mastery or proficiency through scoring or other metrics for reviewing performance at a learning performance task. The tutoring user 112 provides input to the modular learning system 144 using a plurality of learning applications through an interface displayed on the tutoring user's 112 user device 140.

The modular learning system 144 enables a learning application authoring user 104 to manage the drafting, editing, testing, publishing, sale and updates of learning content in applications through an interface displayed on user device 140. That is, the learning application authoring user 104 authors individual pieces of learning content which may be purchased and used by a learning user. For example, a learning application authoring user 104 may create instructional content for learning the backstroke. The instructional content may comprise instructions and multimedia, as well as directions for the learning user 102 to practice aspects of the backstroke in a suitable pool. The learning application authoring user 104 may use a pre-existing application template to create the learning application.

The modular learning system 144 enables a learning application template developing user 110 to create learning templates for use in creating learning applications. The learning application templates provide a framework for creating various types of learning applications. For example, learning application templates may comprise a quiz, simulation, role play, experiment, multimedia material, and other types of learning frameworks. The learning application template developing user 110 may manage the development, testing and sale of the learning application templates to learning content application authoring users 104 through an interface displayed on a user device 140.

The modular learning system 144 enables a learning application translating user 106 to manage the translation and translation updates of learning content in applications and sale of such services to microlearning content application authors through an interface displayed on a user device 140. The translations are provided to the modular learning system 144 and may be stored with the corresponding learning application to enable providing instructions to learning users 102 in a variety of languages.

The modular learning system 144 enables a learning application certifying user 108 to certify various learning applications according to standards applied by the certifying user 108. Such certifying users may include boards of education at various levels, universities, professional standards groups, and other certification authorities. Certifying users 108 may or may not be formal institutions. For example, a certifying user may include a company establishing a set of learning applications to prepare a candidate for a job with the company. The certifying user 108 manages the certification of each learning content application as a part of their respective curricula or syllabi and manages the sale of such certification services to learning content application authoring users, through an interface displayed on user device 140.

The learning facility 132 facilitates the performance of specific learning applications available on the modular learning system 144. Learning facilities 132 may comprise any location suitable for performing types of learning applications. For example, learning facilities 132 may comprise an athletic club, a chemistry lab, a science lab, a university, a library, or a tutor's home. In some embodiments, the modular learning system 144 enables a facility administering user 124 to determine the compatibility of various learning applications which can be performed within learning facility 132 by picking the learning infrastructure available in the learning facility and associating the learning facility 132 with each learning application (e.g. Breaststroke) compatible with the learning infrastructure (e.g. Olympic sized Swimming Pool). In one embodiment, rather than expressly associating the learning facility with individual learning applications, the learning facility administering user 124 indicates to the modular learning system 144 the specific infrastructures and amenities available at the learning facility 132. In this embodiment, the modular learning system 144 enables a learning user 102 or learning application authoring user 104 to identify a learning facility 132 which is compatible with the learning application based on the infrastructure available at the learning facility 132. The modular learning system 144 may also identify compatible learning facilities based on metadata associated with the learning application and the infrastructure indicated by the learning facility administering user 124.

The learning facilities 132 may comprise a variety of types of learning facilities, such as an independent learning facility, institutional learning facility, workplace learning facility, and temporary learning facility. The modular learning system 144 enables an administrator 124 of an independent learning facility owned, managed or franchised by the modular learning system 144 to manage the sale of learning facility access for performances of specific microlearning applications as well as sale of learning tools and materials (e.g. sulphuric acid or swimming goggles) or access to the same in micro increments of time and money ($six/hour or $five/learning application performance) depending on multiple factors like the learning infrastructure to be accessed (e.g. Swimming Pool, Computers, Chemistry Lab), number of hours of access, and the like, through an interface displayed on a user device 140.

The modular learning system 144 enables an administrator 124 of an institutional learning facility like a preschool, school, college or university (e.g. Bangalore University) associated, partnered or linked with the modular learning system 144 to, in addition to managing the sale associated with the independent learning facility (e.g. learning facility access for performances of specific microlearning applications), manage the learning performances of a plurality of learners (students or outsiders) across a plurality of learning applications available on the system (with the learning user's explicit consent), optionally delegated to a plurality of teachers, professors, lecturers or coaches registered as tutoring users 112 on the modular learning system 144, through an interface displayed on a user device 140.

The modular learning system 144 enables an administrator 124 of a workspace learning facility associated, partnered or linked with the modular learning system 144 to, in addition to managing the sale associated with the independent learning facility (e.g. learning facility access for performances of specific microlearning applications), manage the learning performances of a plurality of learners (employees) across a plurality of learning applications available on the system (with the learning user's explicit consent), optionally delegated to a plurality of Human Resource Managers, Trainers and/or immediate superiors, registered as tutoring users 112 on the modular learning system, through an interface displayed on a user device 140.

The modular learning system 144 enables an administrator 124 of a temporary learning facility (e.g. a Cricket Ground available for net practice on Saturdays and Sundays from six in the morning to twelve in the midnight) to, in addition to managing the sale associated with the independent learning facility (e.g. learning facility access for performances of specific microlearning applications), manage the hours of accessibility to the designated learning facility, through an interface displayed on a user device 140. In addition to managing the sale and performance of microlearning applications, an administrator of an independent, institutional, workspace, or temporary learning facility may manage the modular purchase of learning infrastructure (e.g. chemistry equipment, computers, cricket stumps) as well as learning tools, aids and materials (e.g. sulphuric acid, swimming goggles, cricket bat) from the modular learning system or a third party, topic wise, subject wise, location wise or otherwise based on the learning applications intended to be offered in the designated learning facility, through an interface displayed on a user device 140.

The modular learning system 144 enables a learning visit organizing user 114 to manage the organization of learning visits, and the sale of learning visits to learning users 102. The learning visit organizing user 114 may also associate a learning visit with compatible microlearning applications. Such learning visits may comprise, for example, a visit to a factory or industrial area, a museum, or a trip to a city. The learning visit organizing user 114 may associate the learning visit with learning applications and manage the learning performances during the learning visits. The management of performances of associated learning applications may be optionally provided by tutoring users 112. The learning visit organizing user 114 communicates with the modular learning system 144 through an interface displayed on a user device 140.

The modular learning system 144 enables a learning workshop organizing user 116 to manage the organization of workshops available to learning users 102. A workshop comprises a plurality of specific microlearning applications to be performed in the workshop, and a sequence of the microlearning applications to be performed at the workshop. The workshop may also specify learning tools, a designated learning facility, and a tutoring user or tutoring users to perform the workshop. As such, the workshop user organizes performance and modules of learning applications to be performed together with a group of learning users 102. The learning workshop organizing users 116 also manage the sale of such microlearning workshop access and manage the learning performances for a plurality of learners. The learning workshop organizing users communicate with the modular learning system 144 through an interface displayed on a user device 140.

The modular learning system 144 enables a learning tools supplying user 118 to provide learning tools and materials such as chemicals, biology samples, computer software, and other materials for use with learning applications to learning users 102. The learning tools supplying user 118 manages the organization and sale of the learning tools and materials (or optionally, access to the same) to learning users and administrators of learning facilities 132. The learning tools supplying user 118 may also associate learning tools with particular learning applications stored on modular learning system 144. Alternatively, the learning tools supplying user 118 may designate the tools available and the modular learning system 144 may determine which learning applications may require the tools provided by the learning tools supplying user 118. The learning tools supplying user communicates with the modular learning system 144 through an interface displayed on a user device 140.

The modular learning system 144 enables a recruiter 120 of learning users 102 to manage the recruitment of learning users 102 through the modular learning system 144. The recruiter 120 may view and filter learning users 102 by specific learning applications performed on the system, scores, metrics and reviews generated in relation to the learning applications performed by learning users 102. The recruiter may access and filter learning users 102 based on demographic data like the language used in performing the learning application. Recruiting user 120 may also operate as a certifying user 108 to certify particular learning applications that may be desirable to the recruiting user 120. The recruiting user may use the certified application as a filter prior considering learning users for a position. The recruiting user 120 manages recruiting access to the modular learning system 144 through an interface displayed on a user device 140.

The modular learning system 144 enables a funding user 122 of learning users 102 to provide funding and scholarship funds and other support to learning users 102. Such funding users 122 may comprise a parent, sibling, friend, spouse, relative, university, employer, or scholarship/grant offering institution. The funds may be provided for the funding of specific learning users or of specific learning applications, or of specific microlearning goods and services associated with the specific learning applications, in small increments, through an interface displayed on a user device 140.

Although the modular learning environment 100 is described as being composed of various, user devices (e.g. personal computer), a network (e.g. internet, intranet, world wide web), learning facilities (e.g. an Independent Learning Facility, an Institutional Learning Facility), it would be appreciated by one skilled in the art that fewer or more kinds of users (e.g. a Learning Application Fact Checking User, a Web Based Offsite Tutoring User), user devices (e.g. a mobile phone device, a portable gaming console device, a tablet device, a learning console device, gaming console device or server device attached to a television or other screen), networks (e.g. an intranet at a preschool, school, college, university, educational board, professional standards authority, coaching/tuition class; a social or professional network; an intranet at a company, HR department, training department and at a training organization) and learning facilities may comprise the modular learning environment 100, with the present disclosure still falling within the scope of various embodiments.

Figure 2:
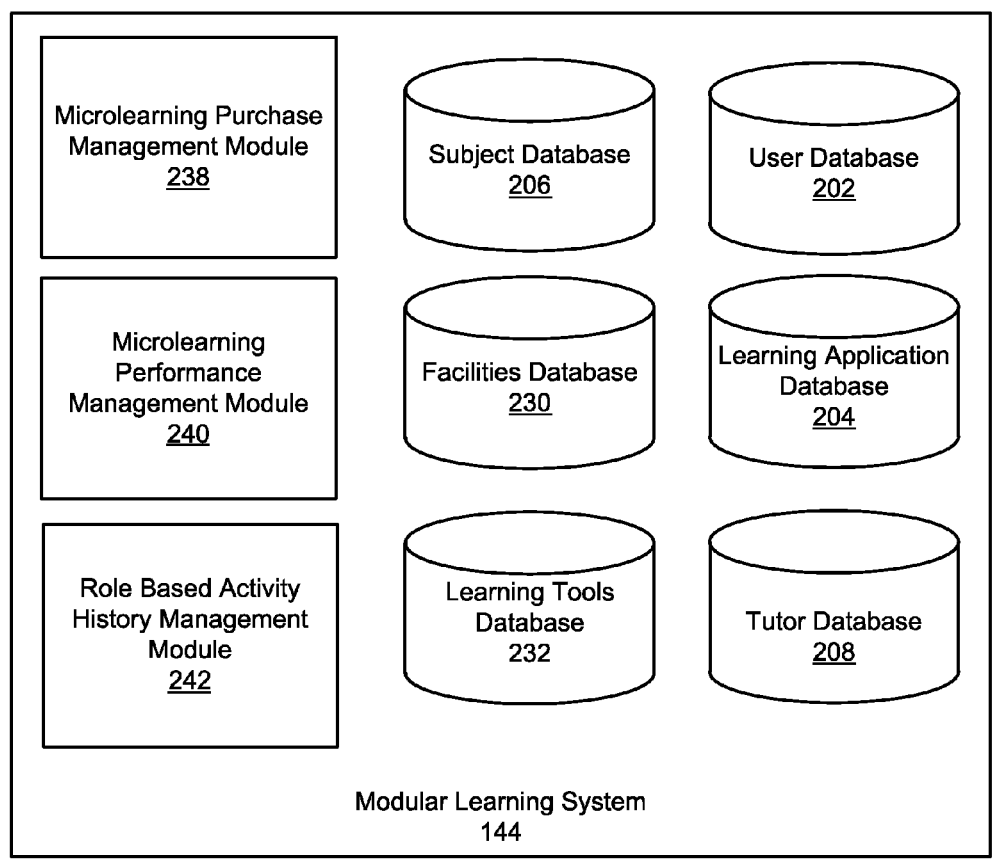
FIG. 2 is a block diagram of a modular learning system according to one embodiment.

FIG. 2 is a block diagram of a modular learning system 144 according to one embodiment. The modular learning system 144 includes a variety of databases and modules for providing learning applications and learning services to users of the modular learning system 144. The modular learning system 144 maintains learning applications in a learning application database 204. The learning applications are sold to users along with microlearning services using the purchase management module 238. Performance of learning applications is enabled by with performance management module 240. Additional modules of the modular learning system 144 are described below.

A user database 202 is configured for receiving, storing, updating and retrieving a plurality of data fields of each user, such as the user's name, address, and contact details. Depending on the user's role in the modular learning system 144, the user database 202 maintains additional information on the user. For example, for a learning user 102, the user database 202 maintains learning history outside the modular learning system 144, learning application performance history on the modular learning system 144, purchase history of learning applications as well as purchase history of a host of related microlearning purchase items like, for example, timed access to learning facility 132, timed access to tutor 112, and purchase of access to a learning tool from learning tools database 232. In some embodiments, the data fields are used to determine purchase compatibility using purchase management module 238 and to determine performance compatibility using performance management module 240.

The user database 202 may maintain information about each type of user based on the user's role in the system. The user information may be stored in a plurality of databases, each database associated with a user role, or the user roles may be stored in a single user database 202. For example, the additional user roles include learning application authoring users, learning facility administering users, learning visit organizing users, learning facility administering users, and other types of users of the modular learning system 144.

In one embodiment, a distinct Learning User Database is configured for receiving, storing, updating and retrieving a plurality of data fields of each learning user 102, comprising the learning user's name, address, contact details as well as learning related data fields like learning history outside the modular learning system 144, learning application performance history on the modular learning system 144, purchase history of learning applications as well as purchase history of a host of related microlearning purchase items like, for example, access to learning facility 132, access to tutor 112, and purchase of access to an learning tool. In one embodiment, a distinct Learning Application Authoring User Database is configured for receiving, storing, updating and retrieving a plurality of data fields of each learning application authoring user, say, user 104. In one embodiment, a distinct Independent Learning Facility Administering User Database is configured for receiving, storing, updating and retrieving a plurality of data fields of each independent learning facility administering user, say, user 124. In one embodiment, a distinct Learning Tools Supplying User Database is configured for receiving, storing, updating and retrieving a plurality of data fields of each learning tools supplying user, say, user 118. In one embodiment, a distinct Learning Visit Organizing User Database is configured for receiving, storing, updating and retrieving a plurality of data fields of each learning visit organizing user 114. In one embodiment, a distinct Learning Application Translating User Database is configured for receiving, storing, updating and retrieving a plurality of data fields of each learning application translating user, say, user 106. In one embodiment, a distinct Learning Application Certifying User Database is configured for receiving, storing, updating and retrieving a plurality of data fields of each learning application certifying user, say, user 108. In one embodiment, a distinct Learning Application Template Developing User Database is configured for receiving, storing, updating and retrieving a plurality of data fields of each learning application template developing user, say, user 110. In one embodiment, a distinct Learning Workshop Organizing User Database is configured for receiving, storing, updating and retrieving a plurality of data fields of each learning workshop organizing user, say, user 116. In one embodiment, a distinct Recruiting User Database is configured for receiving, storing, updating and retrieving a plurality of data fields of each recruiting user, say, recruiting user 120. In one embodiment, a distinct Funding User Database is configured for receiving, storing, updating and retrieving a plurality of data fields of each funding user, say, funding user 122.

In one embodiment, a distinct Institutional Learning Facility Administering User Database is configured for receiving, storing, updating and retrieving a plurality of data fields of each, institutional learning facility administering user, say, user 124. In one embodiment, a distinct Workspace Learning Facility Administering User Database is used to is configured for receiving, storing, updating and retrieving a plurality of data fields of each workspace learning facility administering user, say, user 124. In one embodiment, a distinct Temporary Learning Facility Administering User Database is configured for receiving, storing, updating and retrieving a plurality of data fields of each temporary learning facility administering user, say, user 124. In one embodiment, a distinct Learning Facility Database is configured for receiving, storing, updating and retrieving a plurality of data fields of a plurality of kinds of learning facilities, say, facility 132, as received from a plurality of kinds of learning facility administering users, say, user 124. In one embodiment, a distinct Learning Visits Database is configured for receiving, storing, updating and retrieving a plurality of data fields of each learning visit from the respective learning visit organizing user, say user 114. In some embodiments, the data fields of the databases in the above embodiments are used to determine purchase compatibility using purchase management module 238 and to determine performance compatibility using performance management module 240.

The learning application database 204 is configured for receiving, storing, updating and retrieving all the learning application metadata of all learning applications whose purchase is managed through the module 238. Optionally, all purchase related metadata of learning application, like number of copies accessed per day, segmented by location, language, learning facility, user device, as well as other learning related purchase analytics metadata that may be generated during the purchase process may be received, stored, and updated by the microlearning purchase management module 238 in the learning application database 204.

In one embodiment, database 204 is configured for receiving, storing, updating and retrieving all the learning application metadata of all learning applications whose performance is managed through the module 240. Optionally, all performance related metadata of the learning application, like number of copies performed per day, segmented by location, language, learning facility, user device, as well as other learning related performance analytics metadata that may be generated during the performance process may be received, stored, and updated by the microlearning performance management module 240 in the learning application database 204.

A subject database 206 is configured for receiving, storing, updating and retrieving a plurality of data fields of each subject linked or tagged to each learning application 300 in Subject Metadata 312. The subject database 206 provides a categorization system for the learning applications and enables learning application authoring users, like user 104, to categorize learning applications as belonging to one or more subjects by associating them with one or more subjects, such subjects then stored in subject metadata 312 of each authored learning application 300. The subject database 206 also allows users to search for learning applications according to particular subjects using the subjects associated with the learning applications. For example, a tutoring user 112 with a mathematics specialty may search the learning applications using the subject database 206 to identify mathematics learning applications for the tutor to associate his services with.

A tutor database 208 is configured for receiving, storing, updating and retrieving a plurality of data fields of each tutoring user, comprising the tutoring user's name, address, contact details, as well as learning related data fields like learning users to whom microlearning services have or are being provided, performance data and performance review data for the tutoring services, tutoring history outside the modular learning system 144, and remittance history. In some embodiments, the data fields are used to determine purchase compatibility using purchase management module 238 and to determine performance compatibility using performance management module 240.

A learning facility database 230 is configured for receiving, storing, updating and retrieving a plurality of data fields of a plurality of kinds of learning facilities such as learning facility 132 as received from learning facility administering users 124. In some embodiments, the data fields are used to determine purchase compatibility using purchase management module 238 and to determine performance compatibility using performance management module 240.

A learning tools database 232 is configured for receiving, storing, updating and retrieving a plurality of data fields of each learning tool or material from each learning tools supplying user 118. In some embodiments, the data fields are used to determine purchase compatibility using purchase management module 238 and to determine performance compatibility using performance management module 240.

Each of these databases, such as the tutor database 208, facilities database 230, and learning tools database 232, may also include information relating to purchase and performance compatibility. For example, a tutor in the tutor database may specify the tutor is only willing to teach students aged thirty to forty, or a learning facility may indicate it is only willing to allow entry to learning users who are a member of the facility.

A purchase management module 238 is configured for managing the purchase of learning applications and associated application services as a microlearning stack by the learning user 102.

A performance management module 240 is configured for managing the performance of learning applications and associated application services as a microlearning stack by the learning user 102.

A role-based activity history management module 242 is configured for generating role-based histories in a modular learning system. The role-based histories are generated based on the activities occurring within the modular learning system and the roles of various viewing users. The role-based activity history management module 242 identifies user roles that are permitted to view each type of activity that occurs on the modular learning system 144 and creates histories responsive to history access requests. The histories provided for history access requests are created by determining the applicable user role of the requesting user and identifying activities accessible by the user role and for the user.

In one embodiment, the tutor database, learning facilities database, tools database and other application services databases form a single consolidated application services database in modular learning system 144.

Although the modular learning system 144 is described as being composed of various components like databases and modules, the modular learning system 144 may comprise fewer or more databases, components, and other modules. For example, the modular learning system 144 may include a Learning Application Genre Database, a Locational Learning Facility Price Range Database, a Learning Workshop Database, a Multilingual Dictionary Database, a Concept Tags Database, a Learning Objectives/Outcomes Database, and a Micro tutoring Services Database, and a Skill and Ability Tags Database. The modular learning system 144 may also include an Age Compatibility Module, a Learner Ranking Module, a Tutor Ranking Module, a Learner Billing Module, a Tutor Remittance Module, a Profile Management Module, a User Roles Management Module, a Learning Tools Management Module, a Learning Facility Management Module, Metadata Management Module, a Notification Module, a Recruitment Module, a Funding Module, a Map Module, a Learning Application Template Programming Interface Module, an Age Compatibility Module or a Translation Interface Module, with the present disclosure still falling within the scope of various embodiments. In some embodiments, an individual or group may play a plurality of user roles on the modular learning system, (e.g. tutoring user learning new applications as a learning user through another tutoring user, a learning application authoring user translating the authored application or developing the application template), with the present disclosure still falling within the scope of various embodiments.

In various embodiments the modular learning system 144 may be any of a web application, a mobile application, or an embedded module or subsystem of a social networking environment, a learning content management system, a learning management system, a professional networking environment, an electronic commerce system, an electronic payments system, a mobile operating system, a computer based operating system, or of a tablet based operating system, with the present disclosure still falling within the scope of various embodiments.

In one embodiment, a distinct roles management module is configured for managing and authorizing different roles associated with the various users of the modular learning system 144 and in the respective user databases. For example, the roles management module may provide distinct feature tabs and functionalities to each user based on the role associated with him or her. It can be noted that, the roles management module may enable a user to have one or more roles for accessing the modular learning system 144. For example, a tutoring user can avail the functionality and interface tabs of a learning user and also of a translating user if authorized by the modular learning system 144.

In one embodiment, a distinct metadata management module is configured for managing metadata associated with a plurality of specific learning applications, like learning application 300. In one embodiment, the metadata management module is configured for receiving, storing, updating and retrieving various types of metadata associated with each learning application 300 in the learning application database 204. In another embodiment, the metadata management module is configured for receiving and storing updated metadata of a specific learning application 300 in database 204 at regular intervals of time as updated by different users in authorized user roles and retrieving the required metadata when requested by the purchase management module 238 and the performance management module 240 for determining compatibility and performance compatibility of requested microlearning service stack respectively. In yet another embodiment, the metadata management module enables various users of the modular learning platform to update metadata associated with specific learning applications in the learning application database according to their user role.

It is appreciated that, in some embodiments, various databases like 202, 204, 206, 208, 230, and 232, modules 238, 240 and 242 as well as the databases, engines, modules and components of the above embodiments may be stored in the form of machine readable instructions in the memory of the modular learning system 144 and executed by a processor of the modular learning system 144 to perform one or more embodiments disclosed herein. Alternatively, the various databases like 202, 204, 206, 208, 230, and 232, modules 238, 240 and 242 as well the databases, engines, modules and components of the above embodiments may be implemented in the modular learning system in the form of an apparatus configured to perform one or more embodiments disclosed herein.

Figure 3A:
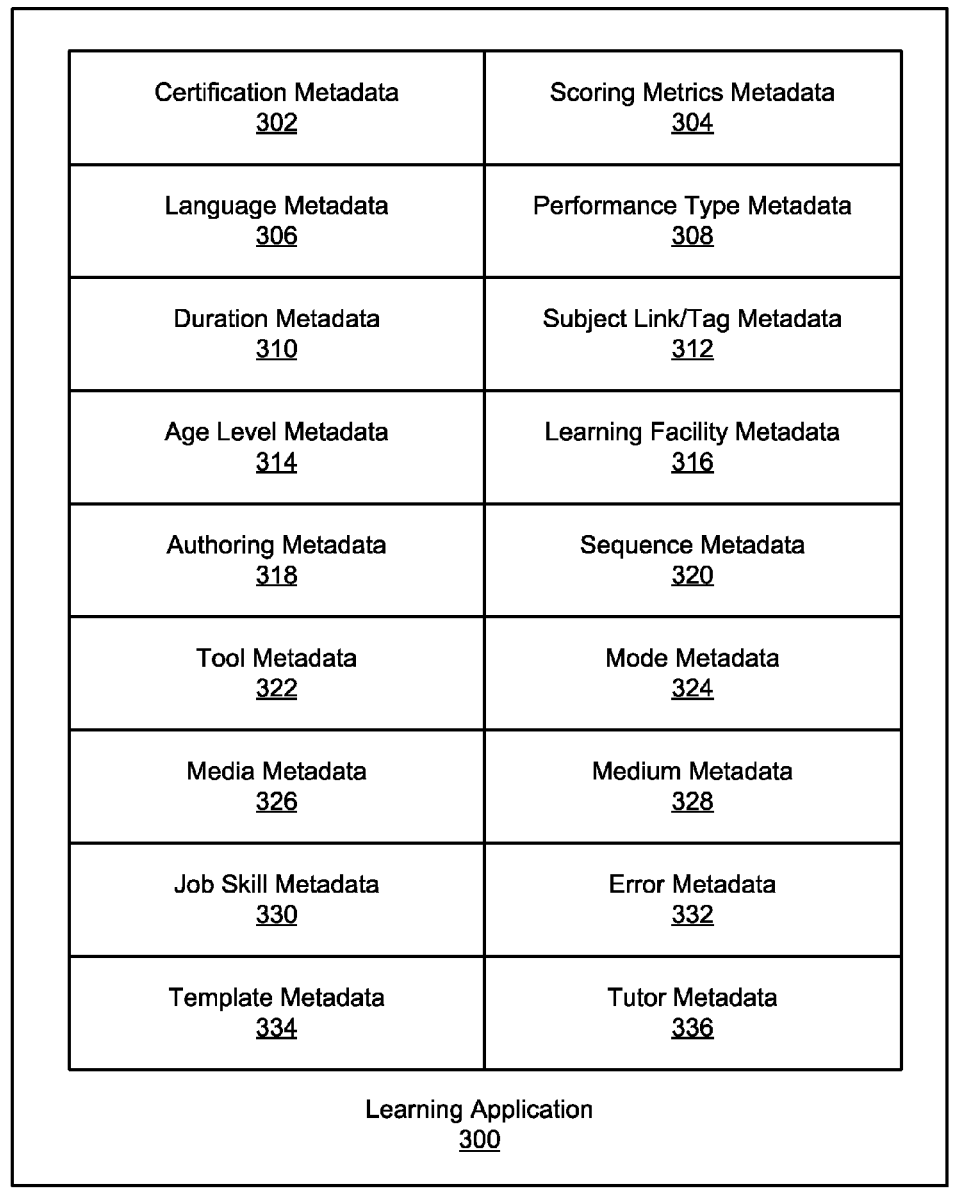
FIG. 3A is a block diagram of a learning application according to one embodiment.

FIG. 3A is a block diagram of a learning application 300, according to one embodiment. Each learning application 300 comprises a plurality of kinds of application metadata in addition to the instructional content and associated media for a particular topic or subject. The instructional content and media of each learning application 300 may comprise a specific unit of instruction for a particular portion of knowledge or a skill, and may vary widely in scope. The learning application 300 may be very narrow in scope, such as "treading water" or may be broad in scope, such as "overview of world history", depending on the authoring process of learning application authoring user 104. The learning application 300 could indicate a theoria (to think, a theory based application using primarily memory, reasoning, logic) performance type or a praxis performance type (to do, a practical performance type or a poeisis performance type). The learning application 300 may comprise metadata indicating associated application services for purchasing or performing the learning application 300 like tutor metadata 336, tools metadata 322 and learning facility metadata 316. In one embodiment, the learning application 300 may be requested for purchase or performance with associated application services as a microlearning service stack, wherein the application services comprise of access to tutoring user 112, access to a learning tool from learning tools database 232 and access to a learning facility from facilities database 230. For example, the media metadata 326 of a learning application 300 provided by learning application authoring user 104 may specify instructions for learning how to swim a breaststroke, but the media metadata 326 does not typically specify individual pools i.e. learning facilities to perform the learning application or tutors to coach and review the performance. Rather, the application services metadata like tutor metadata 336, tools metadata 322 and learning facility metadata 316 indicates tutors, tools, and facilities which the learning user may choose to perform the learning application's instructions.

The Certification Metadata 302 is used to receive, store, retrieve, display and update certification history as well as live certifications of the learning application 300, including, for example, a certification from educational board 108 and another educational board in another state, present as a certifying user in database 202 or a distinct certifying user database. In some embodiments, the certification metadata is also used to determine purchase compatibility in the microlearning purchase management module 238 through learning application database 204 and to determine performance compatibility in the microlearning performance management module 240 through learning application database 204.

The Scoring Metrics Metadata 304 is used to receive, store, retrieve, display and update a plurality of metrics for quantitative and qualitative scoring as defined and updated for learning application 300 by learning content application authoring user 104. In some embodiments, the quantitative scoring of each metric is conducted during the performance by a dedicated module within the learning application 300 itself, while in other embodiments of a performance, especially a non-screen based praxis or poeisis performance, the quantitative and optionally, qualitative score for each metric is received through a user device 140 from the learning user 102 and/or the tutoring user 112. In some embodiments, the scoring metrics metadata is also used to determine purchase compatibility in the microlearning purchase management module 238 through learning application database 204 and to determine performance compatibility in the microlearning performance management module 240 through learning application database 204.

The Language Metadata 306 is used to receive, store, retrieve, display and update a plurality of translations of all user viewable application metadata for learning application 300 translated by, for example, learning application translating user 106 into Bengali, comprising of media metadata 326 like instructional text, subtitles to audio and video instructions, and all other linguistic content for the preview, performance and review of learning application 300 by learning user 102 and preview and review of the learning performance by tutoring user 112. In some embodiments, metadata 306 further comprises translations in at least one other language, of performance type metadata 308, duration metadata 310, subject links and tags metadata 312, age level metadata 314, learning facility metadata 316 authoring metadata 318, sequence metadata 320, tool metadata 322, mode metadata 324, medium metadata 328 and job skill metadata 330. In some embodiments, the language metadata is also used to determine purchase compatibility in the microlearning purchase management module 238 through learning application database 204 and to determine performance compatibility in the microlearning performance management module 240 through learning application database 204.

The Performance Type Metadata 308 is used to receive, store, retrieve, display and update the performance type of the learning application 300. For example, the metadata 308 could indicate a theoria (to think, a theory based application using primarily memory, reasoning, logic, like a 'Biomechanics of Swimming' Pop Quiz) performance type or a praxis performance type (to do, a practical performance type like an 'eight hundred meter Freestyle Swim as per Olympic performance guidelines' or a poeisis performance type (to make, a creation oriented performance type like a '5 minute Synchronized Swimming Choreography'), such that the learning user is already aware of the task or performance type before purchasing and performing the learning application 300. In some embodiments, the performance type metadata is also used to determine purchase compatibility in the microlearning purchase management module 238 through learning application database 204 and to determine performance compatibility in the microlearning performance management module 240 through learning application database 204.

The Duration Metadata 310 is used to receive, store, retrieve, display and update the suggested duration of the learning application 300. In some embodiments, the metadata 310 indicates a fixed duration like, fifteen minutes, or thirty minutes, or one hour, while in other embodiments, the metadata indicates a variable duration with, optionally, a predetermined minimum or maximum duration depending on the duration metadata set by the learning application authoring user 104. In some embodiments, the duration metadata is also used to determine purchase compatibility in the microlearning purchase management module 238 through learning application database 204 and to determine performance compatibility in the microlearning performance management module 240 through learning application database 204.

The Subject Metadata 312 is used to receive, store, retrieve, display and update a plurality of subject links and tags attached to the learning application 300 by the learning content application authoring user from among the subject links and tags present in the Subject Database 206. In some embodiments, the subject links and tags are attached to specific concepts or terms within the Media Metadata 326. In some embodiments, the subject link/tag metadata is also used to determine purchase compatibility in the microlearning purchase management module 238 through learning application database 204 and to determine performance compatibility in the microlearning performance management module 240 through learning application database 204.

The Age Level Metadata 314 is used to receive, store, retrieve, display and update the suggested age level of the learning user 102 for performance of the learning application 300. In some embodiments, the age level is set as a minimum suggested age say, for example, over ten years old by the learning content application authoring user 104. In other embodiments, a range of suggested learner ages is set by the learning application content authoring user 104. In some embodiments, the age level metadata is also used to determine purchase compatibility in the microlearning purchase management module 238 through learning application database 204 and to determine performance compatibility in the microlearning performance management module 240 through learning application database 204.

The Learning Facility Metadata 316 is used to receive, store, retrieve, display and update the suggested learning infrastructure required in a learning facility for performance of the learning application 300. In some embodiments, such learning facilities and infrastructure (e.g. Olympic Sized Swimming Pool) required for the performance of the learning application (e.g. eight hundred meter Freestyle to Olympic Guidelines) is received and updated by the learning content application authoring user 104 by picking the same from a learning facility database 230 available on the modular learning system 144. In other embodiments the metadata 316 is received and updated by the administering user 124 of learning facility 132. In some embodiments, the learning facility metadata is also used to determine purchase compatibility in the microlearning purchase management module 238 through learning application database 204 and to determine performance compatibility in the microlearning performance management module 240 through learning application database 204.

The Authoring Metadata 318 is used to receive, store, retrieve, display and update the authoring metadata received by the learning content application author 104, including for example the name, signature, contact details, intellectual property disclaimer and other information of the user or user group. In some embodiments, the metadata also includes metadata generated by the modular learning system 144 during the authoring user's editing process, including the version history, tracked changes and time stamps of edits and updates to the learning content application. In some embodiments, the metadata may also include citations to other learning content applications or other learning content application authoring users made by the user 104.

The Sequence Metadata 320 is used to receive, store, retrieve, display and update the suggested sequence of performance of the learning application 300 relative to another learning application. The sequence metadata may indicate if the learning application should be performed before, after, instead of, or with another learning application by learning content application authoring user 104. The user 104 may wish for any learning user, say 102 to perform an advanced microbiology learning application 300 only after performing a corresponding beginner's microbiology learning application, irrespective of the learning user's age or quality of performance. In other embodiments, wherein the learning application authoring user is not the author of the suggested beginner's application, the user 104 may input a sequence suggesting to the learning user 102 to perform the learning application before or after a learning application authored by another learning application authoring user. In some embodiments, the sequence metadata is also used to determine purchase compatibility in the microlearning purchase management module 238 through learning application database 204 and to determine performance compatibility in the microlearning performance management module 240 through learning application database 204.

The Tool Metadata 322 is used to receive, store, retrieve, display and update the compatible tools or learning materials to the learning application 300. In some embodiments, the tool compatibility is received from and updated by the learning application authoring user 104 by accessing the tool database 232. In other embodiments, the tool compatibility is received and updated by the learning tools supplying user 118 by accessing the learning application database 204. In still other embodiments, the tool compatibility may be updated by the modular learning system 144. In some embodiments, the tool metadata is used to determine purchase compatibility in the microlearning purchase management module 238 through learning application database 204 and to determine performance compatibility in the microlearning performance management module 240 through learning application database 204. In some embodiments, wherein the learning tool is a peripheral input device which can be connected to the user device 140 during the learning application performance (e.g. Electric Guitar attached to a user device 140 during an 'Introduction to Hard Rock' learning application) the Tool Metadata includes the compatibility to the user device 140. In other embodiments, wherein the learning material is not material to the user device 140, (e.g. Sulphuric Acid during a Chemistry Experiment) the Tool Metadata may not include any additional user device compatibility.

The Mode Metadata 324 is used to receive, store, retrieve, display and update the available modes of performance of the learning application. In some embodiments, the mode metadata is determined by the modes chosen by the learning content application authoring user from the learning application template chosen. In various embodiments, the learning application may comprise an individual learner performance mode, a learner plus learner cooperative performance mode, a learner versus learner competitive performance mode, a learner plus tutor cooperative performance mode, a learner versus tutor competitive performance mode, a limited plurality of learners (e.g. four learners) cooperative performance mode, a limited plurality of learners (e.g. four learners) competitive performance mode, a tutor plus limited plurality of learners (e.g. nine learners) cooperative performance mode (a typical classroom mode). Although the Mode Metadata is described as being composed of various available modes as chosen by the learning application authoring user, various other modes (e.g. a limited plurality of learners vs. a limited plurality of learners competitive performance mode) may comprise the Mode Metadata 324 and still fall within the scope of various embodiments. In some embodiments, the various Media Metadata for the preview, performance and review screens for each mode of the same learning application and the sequence of the same (especially wherein the learning application 300 is performed by multiple users from the same user device and, optionally, by viewing the same display device) is received, stored, retrieved, displayed and updated in the Media Metadata 326. In some embodiments, the mode metadata is also used to determine purchase compatibility in the microlearning purchase management module 238 through learning application database 204 and to determine performance compatibility in the microlearning performance management module 240 through learning application database 204.

The Media Metadata 326 is used to receive, store, retrieve, display and update text, image, audio, video, animation, links and other interactive elements of the learning content application as received and updated by the learning application authoring user 104 during the publishing and revision of the learning content application 300. In other embodiments, the learning application Media Metadata may comprise the theoria, praxis or poeisis task or, optionally, plurality of tasks to be completed during the performance, their sequence, and, optionally, the learning outcomes and objectives of the same. In some embodiments, the media metadata is also used to determine purchase compatibility in the microlearning purchase management module 238 through learning application database 204 and to determine performance compatibility in the microlearning performance management module 240 through learning application database 204.

The Medium Metadata 328 is used to receive, store, retrieve, display and update the medium of access to the learning application preview, review and performance screen during the microlearning performance. For example, for a Beginner's Kathak Dancing microlearning Application, in addition to requiring a compatible learning facility and tutoring user, the learning application authoring user 104 or, optionally, modular learning system 144 may require the preview and review screen to be viewable only on a display device connected to a learning console user device or the display device of a computer device but not a mobile device screen to ensure an optimum learning experience. In another case, for a Kathak Quiz microlearning application, the learning application authoring user 104 or, optionally, modular learning system 144 may require the performance screen, preview screen and review screen to be viewable only on a mobile device screen but not on a display device connected to a learning console user device, or the display device of a computer device. In some embodiments, the medium metadata may further comprise the compatibility to a plurality of software platforms and, optionally, runtime environments as determined by the modular learning system 144. In some embodiments, the medium metadata is also used to determine purchase compatibility in the microlearning purchase management module 238 through learning application database 204 and to determine performance compatibility in the microlearning performance management module 240 through learning application database 204.

The Job Skill Metadata 330 is used to receive, store, retrieve, display and update the skills and abilities tagged to the learning application 300 by the learning application authoring user 104, the recruiting user 120 or, optionally, the modular learning system 144 from the skills and abilities database provided by the modular learning system 144. In some embodiments, the metadata is used by a recruiting user 120 to post the completion of the learning application (optionally, in a controlled testing environment) or group of applications as a minimum requirement for a particular job role to a plurality of potentially employable learning users. In other embodiments, the metadata is used by the recruiting user 120 to post the requirement of completion of the learning application 300 (optionally, in a controlled testing environment) or group of applications as a minimum requirement for a promotion to a higher post in a particular organization, to a plurality of potentially employable learning users. In some embodiments, the job skill metadata is also used to determine purchase compatibility in the microlearning purchase management module 238 through learning application database 204 and to determine performance compatibility in the microlearning performance management module 240 through learning application database 204.

The Error Metadata 332 is used to receive, store, retrieve, display and update the potential errors which can be made by the learning user 102 (e.g. ten potential errors in an auditing microlearning application), as determined by the learning application authoring user 104. In some embodiments, wherein the learning application (e.g. a Karnataka History Quiz) is performed through an input device on a user device 140 itself, the error metadata may be synchronized to each potential input point during the learning application 300 performed through the user device 140 by the learning application authoring user 104. In some embodiments, wherein the learning application (e.g. a Karate kata) 300's error metadata is outside the recordable boundaries of the user device 140, the potential errors may be entered with reference to each instructional step of the performance by the learning application authoring user 104, such that at the time of the performance, the tutoring user (or, in some modes, the learning user 102 himself, another learning user, or the recruiting user 120) may note errors in each observable step of the performance and confirm the same on user device 140 to generate the score. In other embodiments, wherein the error observed by the observing user (say, tutoring user 112) is not part of the potential errors in the Error Metadata 332 of the application 300, the tutoring user 112 may update such errors to the Errors Metadata, or optionally, send the same to the learning application authoring user 104, to be updated after review. In some embodiments, the error metadata is also used to determine purchase compatibility in the microlearning purchase management module 238 through learning application database 204 and to determine performance compatibility in the microlearning performance management module 240 through learning application database 204.

The Template Metadata 334 is used to receive, store, retrieve, display and update the default script, formatting and media modules of the learning application template used to author the learning application 300. In some embodiments, wherein a particular sequence and format of the same has been chosen by the learning content application authoring user from the options offered in the template developed by the learning application template developing user, the chosen setting may be a part of the Template Metadata 334. In various embodiments, the learning application templates may comprise a quiz, role play, simulation, project, experiment, essay, recital, research paper, race, challenge, problem, game, question, exercise or problem set. In some embodiments, the templates may be for performances conducted and supervised in front of a display device with an input device connected to the user device 140, while in other embodiments the templates may be for previews, reviews and guidelines for performances conducted without the input device, with the user device 140 merely placed next to the performance area or learning station (e.g. for Praxis Tasks in Dance Applications) as a reference point. Although the Template Metadata is described as being composed of various available templates as developed by the learning application template authoring user and chosen by the learning application authoring user, various other templates (e.g. a Swimming Race Template, a Patent Drafting Template) may comprise the Template Metadata 334 and still fall within the scope of various embodiments. In some embodiments, the template metadata is also used to determine purchase compatibility in the microlearning purchase management module 238 through learning application database 204 and to determine performance compatibility in the microlearning performance management module 240 through learning application database 204.

The Tutor Metadata 336 is used to receive, store, retrieve, display and update the compatibility of tutoring users to learning content application. In some embodiments, the tutoring user compatibility is received from and updated by the tutoring user 112 by updating the tutor database 208 (e.g. a Mathematics Tutoring User whose medium of instruction is Mandarin updating compatibility to a plurality of Mathematics microlearning applications available in Mandarin, in the tutor database 208). In other embodiments, the tutoring user compatibility metadata is received from and updated by the tutoring user 112 by accessing the learning application database 204. In still other embodiments, the tutoring user compatibility metadata may be updated by the modular learning system 144. In some embodiments, the Tutor Metadata is also used to determine purchase compatibility in the microlearning purchase management module 238 through learning application database 204 and to determine performance compatibility in the microlearning performance management module 240 through learning application database 204.

In various embodiments, the metadata of learning application 300 is retrieved, displayed to and updated by a plurality of kinds of users as may be applicable to the kind of metadata and the kind of user. Optionally, in addition to receiving and storing the metadata, the modular learning system 144 may update the learning application metadata as and when generated in the system through a dynamic metadata update module or through a dedicated administering user. In some embodiments, the learning content application authoring user 104 may further play the role of the learning application template developing user. In some embodiments, the modular learning system 144 may play the role of the learning content application authoring user 104 and, optionally, the role of the learning application template developing user 110 to author and update the media and template metadata of the learning application 300.

In some embodiments, the microlearning purchase management module 238 and microlearning performance management module 240 retrieve some or all of the above metadata associated with the learning application 300 from a learning application database 204 in a repository module of the modular learning system 144.

In some embodiments, the media metadata 326 of the learning application may comprise an electronic textbook, an electronic journal, an instructional video, or an instructional animation. In some embodiments each learning application 300, may be a distinct mobile application, browser based web application, or a desktop application. In some embodiments, each learning application 300 may be an executable file, a program, add in, macro, plug-in, or other program of instructions associated with a plurality of application programming interfaces of the modular learning system 144.

Although the learning application 300 is described as comprising various metadata and associated data fields stored and updated in learning application database 204, fewer or more metadata and associated data fields (e.g. Application Programming Interface Metadata, Organization versus Organization Social Learning Mode Metadata, University versus University Social Learning Mode Metadata, Testing Metadata, Learning Visits Metadata, Learning Workshops Metadata, Tutorials Metadata) may comprise the Learning Application 300 and associated learning application database 204, with the present disclosure still falling within the scope of various embodiments. In some embodiments, each version of the same learning application 300 with different metadata, for example language metadata, is treated as a distinct learning application in learning application database 204.

In some embodiments, an authorization to update certification metadata 302 of a learning application 300 is limited to a predetermined plurality of certifying users like user 108 and recruiting users like user 120. In some embodiments, an authorization to update scoring metrics metadata 304, performance type metadata 308, age level metadata 314, authoring metadata 318, mode metadata 324, media metadata 326, medium metadata 328, and error metadata 332 of a learning application 300 is limited to a predetermined plurality of learning application authoring users like user 104. In some embodiments, an authorization to update language metadata 306 of a learning application 300 is limited to a predetermined plurality of learning application translating users 106. In some embodiments, an authorization to update duration metadata 310 of a learning application 300 is limited to a predetermined plurality of learning application authoring users like user 104 and learning application template developing users like user 110. In some embodiments, an authorization to update subject link/tag metadata 312 of a learning application 300 is limited to a predetermined plurality of users in any user role. In various embodiments, such authorizations may be set by an administrator of modular learning system 144 based on the user role, user profile information and user preferences information of the corresponding users.

In some embodiments, an authorization to update learning facility metadata 316 of a learning application 300 with associated learning facilities is limited to a predetermined plurality of learning facility administering users like user 124. In some embodiments, an authorization to update sequence metadata 320 of a learning application 300 is limited to a predetermined plurality of learning application authoring users like user 104 and tutoring users like user 112. In some embodiments, an authorization to update tool metadata 322 of a learning application 300 with associated learning tools is limited to a predetermined plurality of tool supplying users like user 118. In some embodiments, an authorization to update job skill metadata 330 of a learning application 300 is limited to a predetermined plurality of recruiting users like user 120. In some embodiments, an authorization to update template metadata 334 of a learning application 300 is limited to a predetermined plurality of learning application authoring users like user 104 and a predetermined plurality of template developing users like user 110. In some embodiments, an authorization to update tutor metadata 336 of a learning application 300 with associated tutoring services is limited to a predetermined plurality of tutoring users like user 112. In some embodiments, an authorization to update an optional learning event metadata of a learning application 300 with associated learning workshops, visits and other learning events is limited to a predetermined plurality of learning workshop organizing users like user 116 and learning visit organizing users like user 114. In some embodiments, the associations of application services to learning applications are enabled automatically by a metadata association module in the system 144. In some embodiments, each learning application 300 is associated with a subset of learning facilities in a learning facilities database 230. In some embodiments, each learning application 300 is further associated with a subset of learning stations of each associated learning facility. In some embodiments, each learning application is associated with a subset of tutors in a tutor database 208. In some embodiments, each learning application is associated with a subset of tools in a learning tools database 232.

Figure 3B:
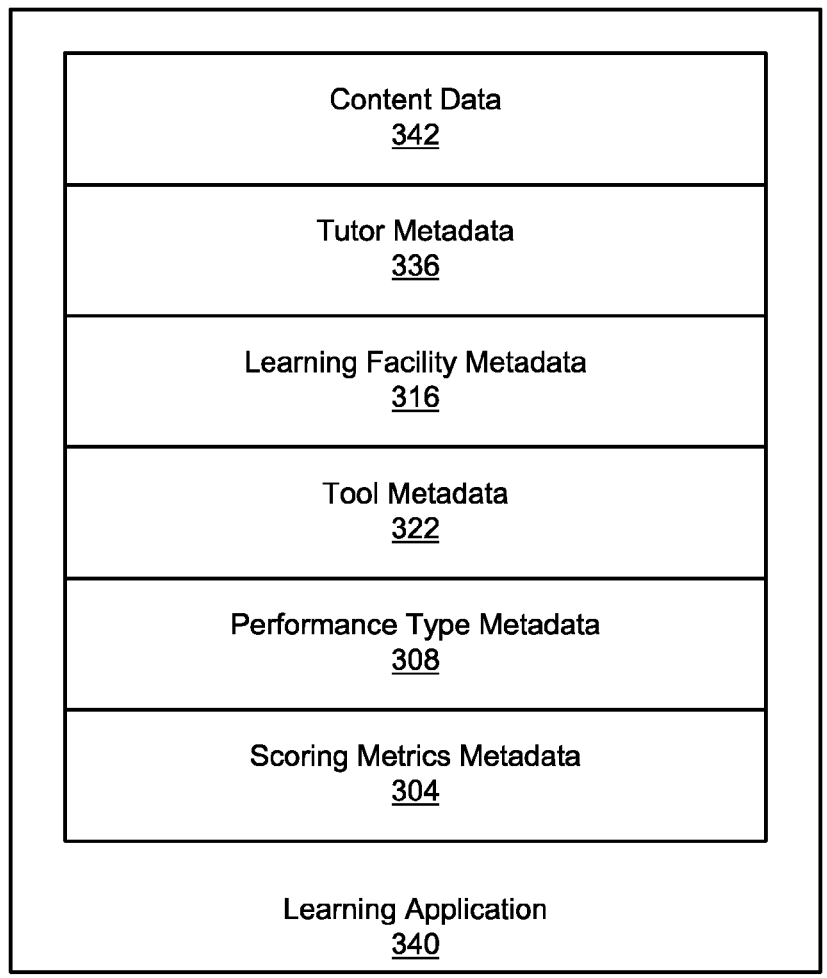
FIG. 3B is a block diagram of a learning application according to an alternative embodiment.

FIG. 3B is a block diagram of a learning application 340 according to another example embodiment. The learning application 340 is illustrated to depict metadata of the learning application related to a microlearning service stack. The learning application 340 also illustrates some other performance data used during its performance by a learner. This microlearning service stack may be requested for purchase or performance by learning user 102. In this embodiment, the microlearning service stack includes a learning application 340, a time based tutoring service by a particular tutor in database 208, time based access to a particular learning facility from database 230, and access to a particular tool from database 232. The particular services above may or may not be associated with the corresponding tutor metadata, facilities metadata, and tool metadata of learning application 340 at the time of a request. The learning application 340 includes content data 342 which designates particular content media and content attributes of the learning application 340. The learning application also includes other metadata as described above, such as tutor metadata 336, learning facility metadata 316, learning tool metadata 322, performance type metadata 308, and scoring metrics metadata 304. As such, the learning application 340 illustrates some aspects of the learning application used for purchase or performance of the learning application 340 by a learner as part of a microlearning service stack, such as content, tutors, facilities, and tools. The learning application 340 may also include any other metadata as described above with reference to FIG. 3A. Any other metadata as described above with reference to FIG. 3A may also be part of the content data 342 of the learning application 340.

The lifecycle of a learning application 300 is now described according to one embodiment. Initially, a learning application template developing user 110 creates a learning application template stored in a distinct template database in a modular learning system 144. Next, the learning application authoring user 104 publishes learning application content stored as media metadata of the learning application 300. In case a template has been chosen for the application 300, the template metadata is stored as well. The tutor metadata, learning facility metadata, learning tool metadata and other optional application services metadata indicating tutoring services, learning facilities, learning tools, and other application service types associated with the learning application 300 are dynamically updated by the corresponding tutoring users, learning facility administrators, tool suppliers and other application service providers. At this point, the learning user may modularly select application services in a microlearning stack to purchase or perform the learning application. Next, the learning user 102 selects the learning application 300 and identifies application services requested for purchase or performance as a consolidated stack. The approval of the purchase or performance request for learning application 300 and particular application services in the microlearning service stack may be determined by the specific metadata of the learning application 300 being associated with corresponding application services, and other specific metadata of the learning application being compatible with the profile information and preferences of the learning user.

Figure 4:
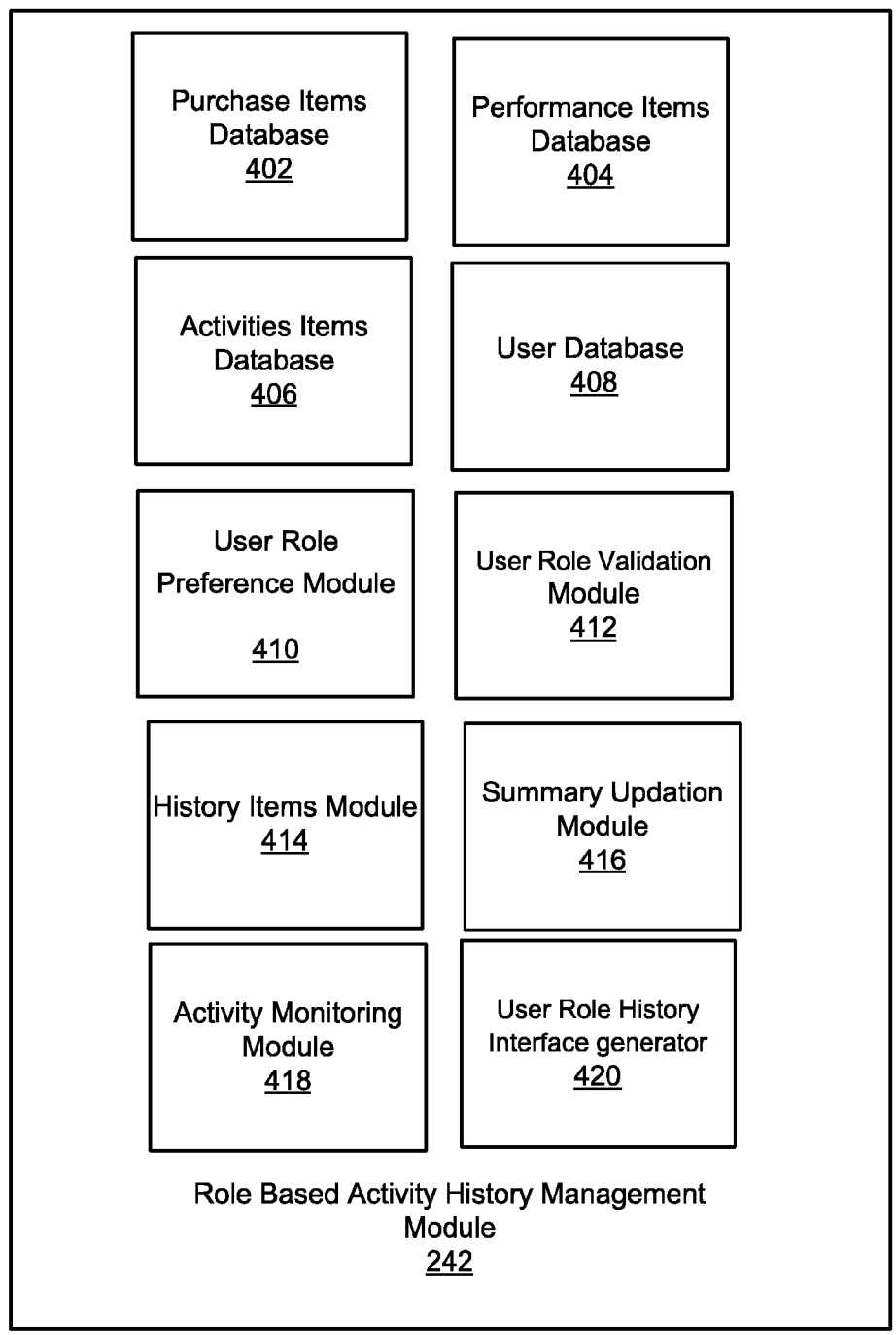
FIG. 4 is a block diagram of a role-based activity history management module according to one embodiment.

FIG. 4 is a block diagram of a role based activity history management module 242. The role based activity history management module 242 includes various databases and computing modules for managing role-based user histories.

A purchase items database 402 is configured for receiving, storing, retrieving and updating a plurality of purchase items generated by the microlearning purchase management module 238 during each unique microlearning application or application service purchase by the plurality of learning users in learning user database 202.

The performance items database 404 is configured for receiving, storing, retrieving and updating a plurality of performance items generated by the microlearning performance management module 240 during each unique microlearning performance by the plurality of learning users in learning user database 202.

The activities items database 406 is configured for receiving, storing, retrieving and updating a plurality of activities items generated by an activity monitoring module 418 for each unique user activity for each unique user on the modular learning system 144. Each activity item indicates action on the modular learning system and may be associated with one or more users. The activity item may also be associated with particular user roles allowed to view information related to the activity item. In additional embodiment each activity stored in the activities items database specifies user roles permitted to access the activity; and wherein the retrieved activity items are retrieved based on the viewing user's user role matching a permitted user role for activity items.

The user database 408 is configured for temporarily receiving, storing, retrieving and updating identity items of each of a plurality of kinds of users from the user database 202 during the generation of role-based histories for the plurality of users in for each user role.

The user role preference module 410 is configured for receiving, storing and retrieving the kind and interface of history items for a plurality of requested user roles to be displayed to a plurality of kinds of authorized viewing users. The module is accessed by the user role validation module 412 to validate if the viewing user's user role is the same as the user role for which the user role history is being generated. In some embodiments, the history preferences are updated for some or all of the requested user roles by modular learning system 144. In other embodiments, the user role history preferences of the requested users are considered as default preferences of the requested users, with each unique requested user in the user role allowed to modify, personalize and update their particular user role's history access preferences through the history settings management interface generated by the user role history interface generator 420 and displayed on the requested user's user device 140. For example, the learning user 102 may modify their performance history access preferences to allow funding user 122 to access the user's performance history while another learning user may grant access to the corresponding performance history to all funding users, some recruiting users and one tutoring user on the modular learning system 144.

The user role validation module 412 is configured for validating the viewing user's user role to determine if the viewing user is authorized to view the purchase history, performance history and other activity history of the requested user. In some embodiments, the validation module is used to determine if the viewing user is the same as the user whose purchase history, performance history and other activities history is requested. In case, the requested user is the same as the viewing user, the user role validation module 412 validates the role of the requested user as being the same as that of the viewing user to history items module 414. In case the viewing user is different from the requested user, the user role validation module 412 accesses the user database 408 and the user role preference module 410 to determine the requested user's user role in the modular learning system 144. For example, a funding user 122 who wishes to access a funded learning user 102's performance history in the last one year, the role validation module may validate the requested user 102's role as a learning user and confirm the same to history items module 414 for generation of the appropriate history items of the requested learning user 102 to be accessed upon the requested user's authorization by the viewing funding user 122.

The history items module 414 is configured for generating, storing, retrieving and updating a plurality of history items for the user role of each unique user whose history is requested by a viewing user on the modular learning system 144 by accessing purchase items from database 402, performance items from database 404, and activities items from database 406. In some embodiments, a plurality of history items may be generated and stored for future access by the user role history interface generator 420 for each unique user in a user role.

The summary updation module 416 is configured for receiving, storing, retrieving and updating history summary updation preferences of one or a plurality of requested users for the authorized viewing user. In some embodiments, an authorized viewing user may prefer the activity history summary of requested users to be updated after predetermined intervals of time. For example, a tutoring user 112 authorized to access the performance history of ten learning users may wish to view a summary of the performance history of the learning users once an hour. In another example, an independent learning facility administering user 124 authorized to access the purchase history of twenty five learning users visiting the facility regularly, may wish to view a summary of the purchase history of the learning users once in three months. The module 416 is accessed by history items module 414 to determine the frequency and intervals of the history items summary generation for future access upon request by the viewing user.

The activity monitoring module 418 is configured for monitoring activities conducted on or through the modular learning system 144 between various users on the system 144. These activities are stored as activities items in the activities items database 406. In various embodiments, the activities could include new applications performed, monitored, reviewed, funded, scored, published, translated, certified, purchased, sold, edited, as well as learning facilities set up, accessed, booked; tutoring services, learning facility access, learning events access, purchased and sold; user profiles updated with new identity items, update purchase compatibility or performance compatibility, among other activities. In some embodiments, the user role preferences for each viewing user's user role in module 414 allow for access to history items relating to activities conducted by a predetermined subset of authorized requested user roles, to the viewing user. For example, the user role preferences of a viewing funding user 122 may allow for access to performance histories of learning users being funded by the funding user. In some embodiments, the activity monitoring module 418 does not capture purchase or performance activities as these activities are monitored by the microlearning purchase management module 238 and the microlearning performance management module 240, with the items thus generated being received by the purchase items database 402 and performance items database 404 respectively. In some embodiments, the activity monitoring module 418 monitors activities of the each of a plurality of kinds of users on a plurality of kinds of user devices and at a plurality of kinds of associated learning facilities.

The user role history interface generator 420 is configured for retrieving the plurality of user role history items of the requested user from the history items module 414 and displays the same to the viewing user on a user device 140. In some embodiments, the user role history interface generator 420 generates and displays updated user role history interface items upon request to the viewing user on a user device 140 by retrieving the same dynamically at predetermined intervals of time from module 414.

Although the role-based activity history management module is described as being composed of various modules, fewer or more modules (e.g. History Access Preferences Module, History Items Consolidation Module) may comprise the module with the present configuration still falling within the scope of various embodiments.

Figure 5:
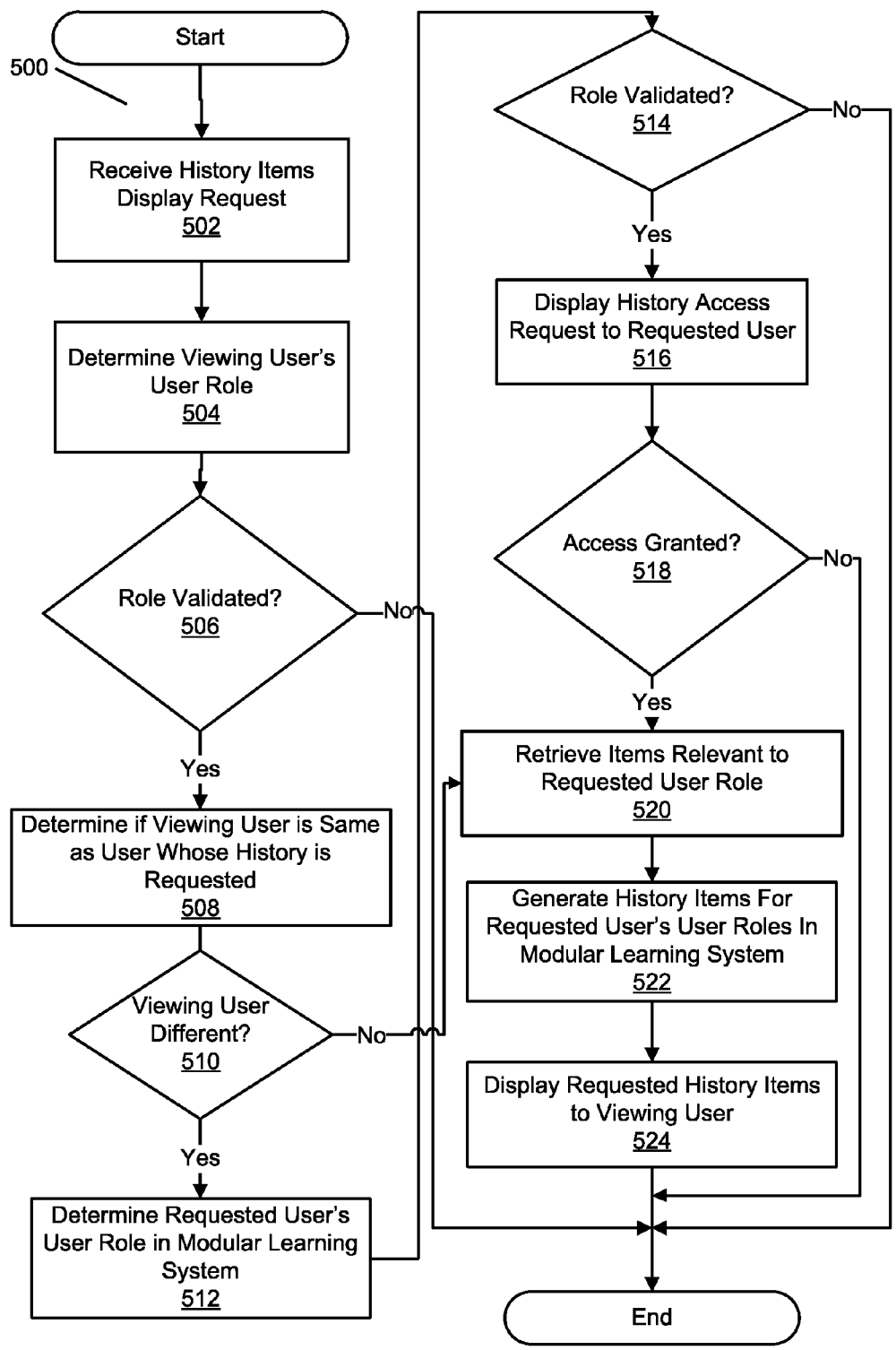
FIG. 5 is a flow diagram of a method for generating role-based activity histories in a modular learning system environment according to one embodiment.

FIG. 5 is a flow diagram 500 of a method for generating role-based activity histories in a modular learning system according to one embodiment. At step 502, the role based activity history management module 242 receives a history items display request from a viewing user on the modular learning system 144 through an interface generated by user role history interface generator 420 on a user device 140. At step 504, the user role validation module 412 receives a role validation request for the viewing user and corresponding user role. At step 506, the user role validation module 412 determines the viewing user's user role in the modular learning system 144 by accessing the identity items of the viewing user in user database 408 and the user role items in module 410. If the viewing user's user role cannot be validated after accessing the modules, the history items display request is denied.

At step 508, the role based activity history management module 242 requests the user role validation module 412 to determine if the viewing user is the same as the user whose history is requested. At step 510, the user role validation module 412 determines if the viewing user is the same as the user whose history is requested (i.e., the user is requesting his own history). If the requested user is the same as the viewing user, the user role validation module 412 validates the role of the requested user as being the same as that of the viewing user to history items module 414 and the role based activity history management module 242 proceeds directly to step 520. At step 512, if the viewing user is different from the requested user, the role validation module accesses the user database 408 and the user role preferences module 410 to determine the requested user's user role in the modular learning system 144.

At step 514, the user role validation module 412 determines the requested user's user role in the modular learning system 144 by accessing the identity items of the requested user in user database 408 and the user role items in user role preference module 410. If the requested user's user role cannot be validated after accessing the modules, the history items display request is denied.

At step 516, the user role history interfaces generator 420 displays the history access request to the requested user. In some embodiments, the user role preferences module accesses the activity history access preferences of the requested user to determine the kind of activity items authorized to be accessed and the kind of user roles authorized to access the requested user's activity history. In such embodiments, if such access is authorized to the viewing user or viewing user role, the user role preferences module may directly grant access to the requested user's activity history.

At step 518, the user role history interface generator 420 receives an access confirmation or access denial input from the requested user through an interface generated on a user device 140. If access is denied, an access denied interface item may be displayed through an interface generated by user role history interface generator 420 on the viewing user's user device 140. In an embodiment, the access to activity item is based on default user role history preference.

At step 520, if access is manually granted, automatically granted or when the viewing user is the same as the requested user, the history items module 414 retrieves purchase items, performance items and other activities items for the requested user by accessing the purchase items database 402, performance items database 404 and activities items database 406.

At step 522, the history items module 414 generates history items of the requested user for the viewing user based on items retrieved in the previous step and user role preferences for the requested user's particular user role. At step 524, the user role history interface generator 420 retrieves the history items from history items module 414, and displays the corresponding requested user's history interface items through the preferred viewing user role interface on the viewing user's user device 140.

Although the method for generating role-based activity histories in a modular learning system environment is described as being composed of various steps, fewer or more steps (e.g. Generate History Items Summary of Predetermined Plurality of Requested Users, Receive History Access Preferences from Requested Users) may comprise the method with the present configuration still falling within the scope of various embodiments.

Computing Machine Architecture

Figure 6:
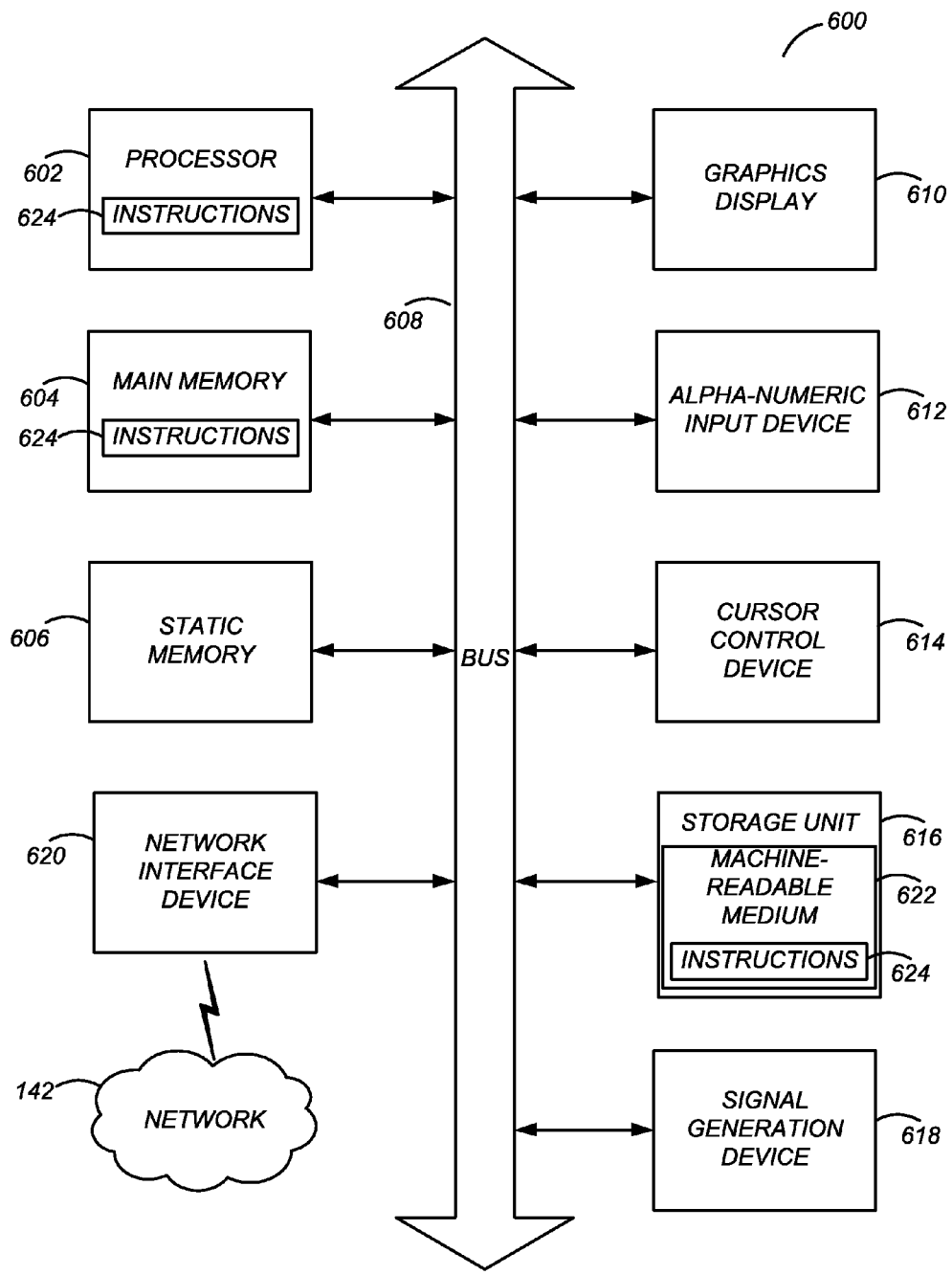
FIG. 6 illustrates components of an example machine able to read instructions from a machine-readable medium and execute them in a processor (or controller) according to one embodiment.

FIG. 6 is a block diagram illustrating components of an example machine suitable for use as a modular learning system 144, in which any of the embodiments disclosed herein may be performed, according to one embodiment. This example machine is able to read instructions from a machine-readable medium and execute them in a processor (or controller).

Specifically, FIG. 6 shows a diagrammatic representation of a machine in the example form of a computer system 600 within which instructions 624 (e.g. software) for causing the machine to perform any one or more of the methodologies discussed herein may be executed. In alternative embodiments, the machine operates as a standalone device or may be connected (e.g. networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes a processor 602 (e.g. a central processing unit (CPU), a graphics processing unit (GPU), a digital signal processor (DSP), one or more application specific integrated circuits (ASICs), one or more radio-frequency integrated circuits (RFICs), or any combination of these), a main memory 604, and a static memory 606, which are configured to communicate with each other via a bus 608. The computer system 600 may further include a graphics display unit 610 (e.g. a plasma display panel (PDP), a liquid crystal display (LCD), a projector, or a cathode ray tube (CRT)). The computer system 600 may also include alphanumeric input device 612 (e.g. a keyboard), a cursor control device 614 (e.g. a mouse, a trackball, a joystick, a motion sensor, or other pointing instrument), a storage unit 616, a signal generation device 618 (e.g. a speaker), and a network interface device 620, which also are configured to communicate via the bus 608.

The storage unit 616 includes a machine readable medium 622 on which is stored instructions 624 (e.g. software) embodying any one or more of the methodologies or functions described herein. The instructions 624 (e.g. software) may also reside, completely or at least partially, within the main memory 604 or within the processor 602 (e.g. within a processor's cache memory) during execution thereof by the computer system 600, the main memory 604 and the processor 602 also constituting machine-readable media. The instructions 624 (e.g. software) may be transmitted or received over a network 142 via the network interface device 620.

While machine readable medium 622 is shown in an example embodiment to be a single medium, the term "machine-readable medium" should be taken to include a single medium or multiple media (e.g. a centralized or distributed database, or associated caches and servers) able to store instructions (e.g. instructions 624). The term "machine-readable medium" shall also be taken to include any medium that is capable of storing instructions (e.g. instructions 624) for execution by the machine and that cause the machine to perform any one or more of the methodologies disclosed herein. The term "machine-readable medium" includes, but not be limited to, data repositories in the form of solid-state memories, optical media, and magnetic media.

The modular learning system 144 may be one or more servers in which one or more methods disclosed herein are performed. The processor 602 may be a microprocessor, a state machine, an application specific integrated circuit, a field programmable gate array, etc. (e.g. Intel® Pentium® processor). The main memory 604 may be a dynamic random access memory and/or a primary memory of the modular learning system 144. The static memory 606 may be a hard drive, a flash drive, and/or other memory information associated with the modular learning system 144.

The bus 608 may be an interconnection between various circuits and/or structures of the modular learning system 144. The video display 610 may provide graphical representation of information on the modular learning system 144. The alphanumeric input device 612 may be a keypad, keyboard and/or any other input device. The cursor control device 614 may be a pointing device such as a mouse.

The storage unit 616 may be a hard drive, a storage system, and/or other longer term storage subsystem. The signal generation device 618 may be a bios and/or a functional operating system of the modular learning system 144. The network interface device 620 may be a device that may perform interface functions such as code conversion, protocol conversion and/or buffering required for communication to and from a network (e.g. the network 142 of FIG. 1). The machine readable medium 622 may provide instructions 624 on which any of the methods disclosed herein may be performed. The instructions 624 may provide source code and/or data code to the processor 602 to enable any one/or more operations disclosed herein. For example, the modular learning system 144 may be stored in the form of instructions 624 on a storage medium such as the main memory 604 and/or the machine readable medium 622 such as compact disk.

In an embodiment, the invention further describes a non-transitory computer readable storage medium having tangibly embodied thereon a program of instructions executable by a processor (e.g. the modular learning system 144) for performing a method for generating role-based histories in a modular learning system as illustrated in FIG. 5.

Additional Configuration Considerations

The role-based activity histories allow users to identify and select histories of activity in the modular learning system related to the user and the user's role. The histories of activity can be used by various users for different purposes. For example, a learning facility may use history of accesses to the learning facility to determine whether to expand or contract availability of the learning facility. A funding user may request performance history data for learning applications to determine which learning applications to fund, and the system may identify historical information of the learning applications that best improve learner performance in order to select learning applications to fund. In addition, the type of history generated for each user role may differ, which allows each user to view a customized view of activities on the system. These customized views allow users to see information presented in a way that is useful to the particular user role of the user and allows for protecting private information. In some embodiments, the private information is anonymized in order to allow display to certain types of users while allowing for meaningful history review. For example, a funding user may seek to determine which learning applications provide better scores for learning users. The learning users' performance scores may be anonymized before presentation to the funding user to protect the learning user identities. Alternately, the funding user may seek to actively promote certain applications within the modular learning system in an attempt to increase expertise in a particular area. For example, a local trade business council may have a funding role and may seek to increase the number of trained machine operators in order to ensure adequate supply of skilled machinists for employers at a local industrial park. The funding user, here the local trade counsel, can fund applications with appropriate online, facility, and tutor resources. These can matched by the modular learning system with learners having the requisite role, e.g., some prior training history as identified by the modular learning system, and that would be interested in working through the applications and courses to get trained.

Throughout this specification, plural instances may implement modules, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate modules in example configurations may be implemented as a combined structure or module. Similarly, structures and functionality presented as a single module may be implemented as separate modules. These and other variations, modifications, additions, and improvements fall within the scope of the subject matter herein.

Certain embodiments are described herein as including functionality implemented in computing logic or a number of components, modules, or mechanisms, for example, as illustrated in FIGS. 2 and 4. Modules may constitute either software modules (e.g. code embodied on a machine-readable medium or in a transmission signal) or hardware modules. A hardware module is tangible unit capable of performing certain operations and may be configured or arranged in a certain manner. In example embodiments, one or more computer systems (e.g. a standalone, client or server computer system) or one or more hardware modules of a computer system (e.g. a processor or a group of processors) may be configured by software (e.g. an application or application portion) as a hardware module that operates to perform certain operations as described herein.

In various embodiments, a hardware module may be implemented mechanically or electronically. For example, a hardware module may comprise dedicated circuitry or logic that is permanently configured (e.g. as a special-purpose processor, such as a field programmable gate array (FPGA) or an application-specific integrated circuit (ASIC)) to perform certain operations. A hardware module may also comprise programmable logic or circuitry (e.g. as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g. configured by software) may be driven by cost and time considerations.

The various operations of example methods described herein may be performed, at least partially, by one or more processors, e.g. processor 602, that are temporarily configured (e.g. by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g. the Internet) and via one or more appropriate interfaces (e.g. application program interfaces (APIs).)

In another embodiment, the microlearning purchase and performance interface provided by the modular learning system 144 can be accessed over a local area network, intranet or virtual private network accessible to a limited plurality of user devices at a preschool, school, college, university, educational board, professional standards authority, coaching class, a company, HR department, training department or at a training organization through a user device.

In another embodiment, the microlearning purchase and performance interface provided by the modular learning system 144 can be accessed over a wide area network, General Packet Radio Service network, an Enhanced Data for Global Evolution network, a 3G telecommunications network, a 4G LTE telecommunications network or other telecommunications network through a user device.

The performance of certain of the operations may be distributed among the one or more processors, not only residing within a single machine, but deployed across a number of machines. In some example embodiments, the one or more processors or processor-implemented modules may be located in a single geographic location (e.g. within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g. a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Although the present embodiments have been described with reference to specific example embodiments, it will be evident that various modifications and changes may be made to these embodiments without departing from the broader spirit and scope of the various embodiments. For example, the various devices, modules, databases, etc. described herein may be enabled and operated using hardware circuitry (e.g. complementary metal-oxide-semiconductor (CMOS) based logic circuitry), firmware, software and/or any combination of hardware, firmware, and/or software (e.g. embodied in a machine readable medium).

Unless specifically stated otherwise, discussions herein using words such as "processing," "computing," "calculating," "determining," "presenting," "displaying," or the like may refer to actions or processes of a machine (e.g. a computer) that manipulates or transforms data represented as physical (e.g. electronic, magnetic, or optical) quantities within one or more memories (e.g. volatile memory, non-volatile memory, or a combination thereof), registers, or other machine modules that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and modules of the embodiments herein. This is done merely for convenience and to give a general sense of the invention. This description should be read to include one or at least one and the singular also includes the plural unless it is obvious that it is meant otherwise.

According to the embodiments described in FIG. 1 through 5, various methods and electric structures may be embodied using transistors, logic gates, and electrical circuits (e.g. Application Specific Integrated Circuitry and/or in Digital Signal Processor circuitry). For example, the purchase management module 238, performance management module 240 and other modules of FIGS. 1 to 5 may be enabled using a purchase management circuit, a performance management circuit, and other circuits using one or more of the technologies described herein. In addition, it will be appreciated that the various operations, processes, and methods disclosed herein may be embodied in a machine-readable medium and/or a machine accessible medium compatible with a data processing system (e.g. a server) and may be performed in any order. Accordingly, the specification and drawings are to be regarded in an illustrative rather than a restrictive sense.

Upon reading this disclosure, those of skill in the art will appreciate still additional alternative structural and functional designs for a system and a process for managing the purchase and performance of learning applications and associated application services in a microlearning stack through the disclosed principles herein. Thus, while particular embodiments and applications have been illustrated and described, it is to be understood that the disclosed embodiments are not limited to the precise construction and modules disclosed herein. Various modifications, changes and variations, which will be apparent to those, skilled in the art, may be made in the arrangement, operation and details of the method and apparatus disclosed herein without departing from the spirit and scope defined in the appended claims.

What is claimed is:

1. A computer-implemented method for generating role-based histories in a modular learning system, the method comprising:
  maintaining an activities items database including activity items reflecting activities performed in the modular learning system including at least one of learning application purchase information or learning application performance information;
  receiving, from a viewing user, a history items display request for viewing activity items specifying a requested user whose history is requested and a user role of the viewing user;
  validating the user role associated with the history items display request is a user role associated with the viewing user in a user database;
  determining whether the viewing user is the requested user;
  determining a user role associated with the requested user;
  responsive to a determination that the viewing user is the requested user:
    retrieving activity items from the activities items database relevant to the user role associated with the requested user, generating history items based on retrieved activity items and on the user role of the viewing user, and
providing for display the history items requested by the viewing user;
responsive to a determination that the viewing user is not the requested user, providing for display a history access request to the requested user;
responsive to approval by the requested user of the history access request, retrieving activity items from the activities items database relevant to the user role associated with the requested user;
further responsive to the approval by the requested user, generating history items based on the retrieved items, the generated history items based on the viewing user's user role; and
providing for display the requested or generated history items to the viewing user.

2. The computer-implemented method of claim 1, wherein the activities items database maintains activities items reflecting learning application purchase information.

3. The computer-implemented method of claim 1, wherein the activities items database maintains activities items reflecting learning application performance information.

4. The computer-implemented method of claim 1, wherein the activities items database maintains activities items generated by monitoring activities of users of the modular learning system.

5. The computer-implemented method of claim 1, wherein each activity stored in the activities items database specifies user roles permitted to access the activity; and wherein the retrieved activity items are retrieved based on the viewing user's user role matching a permitted user role for activity items.

6. The computer-implemented method of claim 1, wherein the generated history items are generated based on the viewing user's user role.

7. The computer-implemented method of claim 1, wherein the viewing user role differs from the requested user's user role.

8. The computer-implemented method of claim 1, wherein access to an activity item is based on a default user role history preference, the default user role history preference modifiable by the viewing user.

9. A non-transitory computer readable storage medium having tangibly embodied thereon a program of instructions executable by a processor for performing a method for generating role-based histories in a modular learning system, the method comprising:
maintaining an activities items database including activity items reflecting activities performed in the modular learning system;
receiving, from a viewing user, a history items display request specifying a requested user whose history is requested and a user role of the viewing user;
validating the user role associated with the history items display request is a user role associated with the viewing user in a user database;
determining whether the viewing user is the requested user;
determining a user role associated with the requested user;
responsive to a determination that the viewing user is the requested user:
retrieving activity items from the activities items database relevant to the user role associated with the requested user,
generating history items based on retrieved activity items and on the user role of the viewing user, and
providing for display the history items requested by the viewing user;
responsive to a determination that the viewing user is not the requested user, providing for display a history access request to the requested user;
responsive to approval by the requested user of the history access request, retrieving activity items from the activities items database relevant to the user role associated with the requested user;
further responsive to the approval by the requested user, generating history items based on the retrieved items, the generated history items based on the viewing user's user role; and
providing for display the requested or generated history items to the viewing user.

10. The non-transitory computer readable storage medium of claim 9, wherein the activities items database maintains activities items reflecting learning application purchase information.

11. The non-transitory computer readable storage medium of claim 9, wherein the activities items database maintains activities items reflecting learning application performance information.

12. The non-transitory computer readable storage medium of claim 9, wherein the activities items database maintains activities items generated by monitoring activities of users of the modular learning system.

13. The non-transitory computer readable storage medium of claim 9, wherein each activity stored in the activities items database specifies user roles permitted to access the activity; wherein the activity items are retrieved based on a match of the viewing user's user role with a permitted user role for the activity items.

14. The non-transitory computer readable storage medium of claim 9, wherein the generated history items are generated based on the viewing user's user role.

15. The non-transitory computer readable storage medium of claim 9, wherein the viewing user role differs from the requested user role.

16. The non-transitory computer readable storage medium of claim 9, wherein access to an activity item is based on a default user role history preference, the default user role history preference modifiable by the viewing user.

17. An apparatus comprising:
a network interface;
a processor, coupled to the network interface, configured for executing instructions; a memory, coupled to the processor, storing instructions for execution on the processor, the instructions comprising the steps of:
maintaining an activities items database including activity items reflecting activities performed in the modular learning system;
receiving, from a viewing user, a history items display request specifying a requested user whose history is requested and a user role of the viewing user;
validating the user role associated with the history items display request is a user role associated with the viewing user in a user database;
determining whether the viewing user is the requested user;
determining a user role associated with the requested user;
responsive to a determination that the viewing user is the requested user:

retrieving activity items from the activities items database relevant to the user role associated with the requested user, generating history items based on retrieved activity items and on the user role of the viewing user, and providing for display the history items requested by the viewing user;

responsive to a determination that the viewing user is not the requested user, providing for display a history access request to the requested user;

responsive to approval by the requested user of the history access request, retrieving activity items from the activities items database relevant to the user role associated with the requested user;

further responsive to the approval by the requested user, generating history items based on the retrieved items, the generated history items based on the viewing user's user role; and providing for display the requested or generated history items to the viewing user.

18. The apparatus of claim 17, wherein the activities items database maintains activities items reflecting learning application purchase information.

19. The apparatus of claim 17, wherein the activities items database maintains activities items reflecting learning application performance information.

20. The apparatus of claim 17, wherein the activities items database maintains activities items generated by monitoring activities of users of the modular learning system.

* * * * *